United States Patent
Kim et al.

(10) Patent No.: US 9,928,599 B2
(45) Date of Patent: Mar. 27, 2018

(54) APPARATUS AND METHOD FOR OBJECT DETECTION BASED ON DOMINANT PIXEL INFORMATION

(71) Applicant: INDUSTRY—ACADEMIC COOPERATION FOUNDATION, YONSEI UNIVERSITY, Seoul (KR)

(72) Inventors: Euntai Kim, Seoul (KR); Jisu Kim, Seoul (KR); Jeonghyun Baek, Seoul (KR)

(73) Assignee: INDUSTRY—ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 98 days.

(21) Appl. No.: 14/952,318

(22) Filed: Nov. 25, 2015

(65) Prior Publication Data

US 2016/0148040 A1    May 26, 2016

(30) Foreign Application Priority Data

Nov. 25, 2014  (KR) ........................ 10-2014-0165450

(51) Int. Cl.
| | | |
|---|---|---|
| G06K 9/00 | (2006.01) | |
| G06T 7/00 | (2017.01) | |
| G06K 9/62 | (2006.01) | |
| G06T 7/73 | (2017.01) | |

(52) U.S. Cl.
CPC ............ *G06T 7/0081* (2013.01); *G06K 9/623* (2013.01); *G06T 7/73* (2017.01); *G06K 2209/23* (2013.01); *G06T 2207/20076* (2013.01); *G06T 2207/20081* (2013.01); *G06T 2207/20216* (2013.01)

(58) Field of Classification Search
CPC ................... G06T 7/0081; G06T 2207/20081
See application file for complete search history.

(56) References Cited

U.S. PATENT DOCUMENTS

| | | | | |
|---|---|---|---|---|
| 5,969,753 | A  * | 10/1999 | Robinson ................ | G06T 7/001 348/125 |
| 2014/0233848 | A1* | 8/2014 | Han .................... | G06K 9/00375 382/154 |
| 2017/0263139 | A1* | 9/2017 | Deng ..................... | G08G 5/065 |

FOREIGN PATENT DOCUMENTS

JP        2011-150627 A      8/2011

\* cited by examiner

*Primary Examiner* — Oneal R Mistry

(57) ABSTRACT

Provided are an apparatus and a method for detecting an object in an image, and particularly, an apparatus and a method for detecting a vehicle in an image. The present invention has been made in an effort to provide an apparatus and a method for object detection based on dominant pixel information which generate an average image and a standard deviation image of training object images, acquire a feature area representing a feature of a training object, and detect an object by using a value acquired by calculating a similarity between the average image in the feature area and a target image as a feature vector to efficiently detect a target object with a small calculation amount.

4 Claims, 11 Drawing Sheets

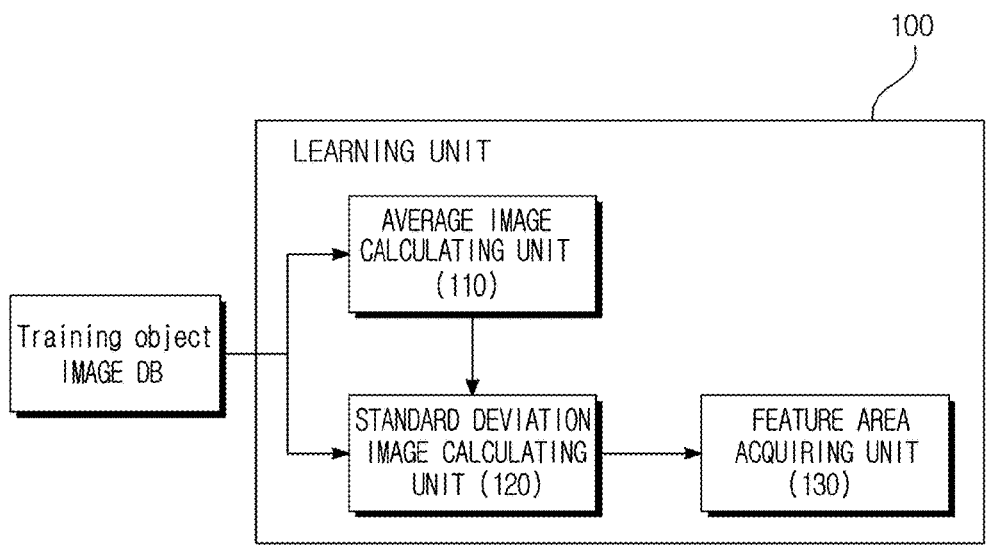
{Fig.1A}

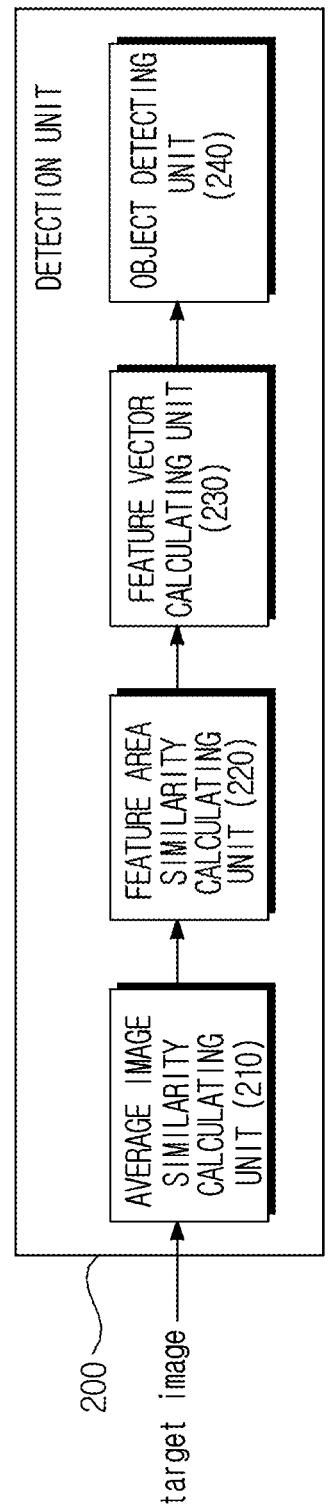

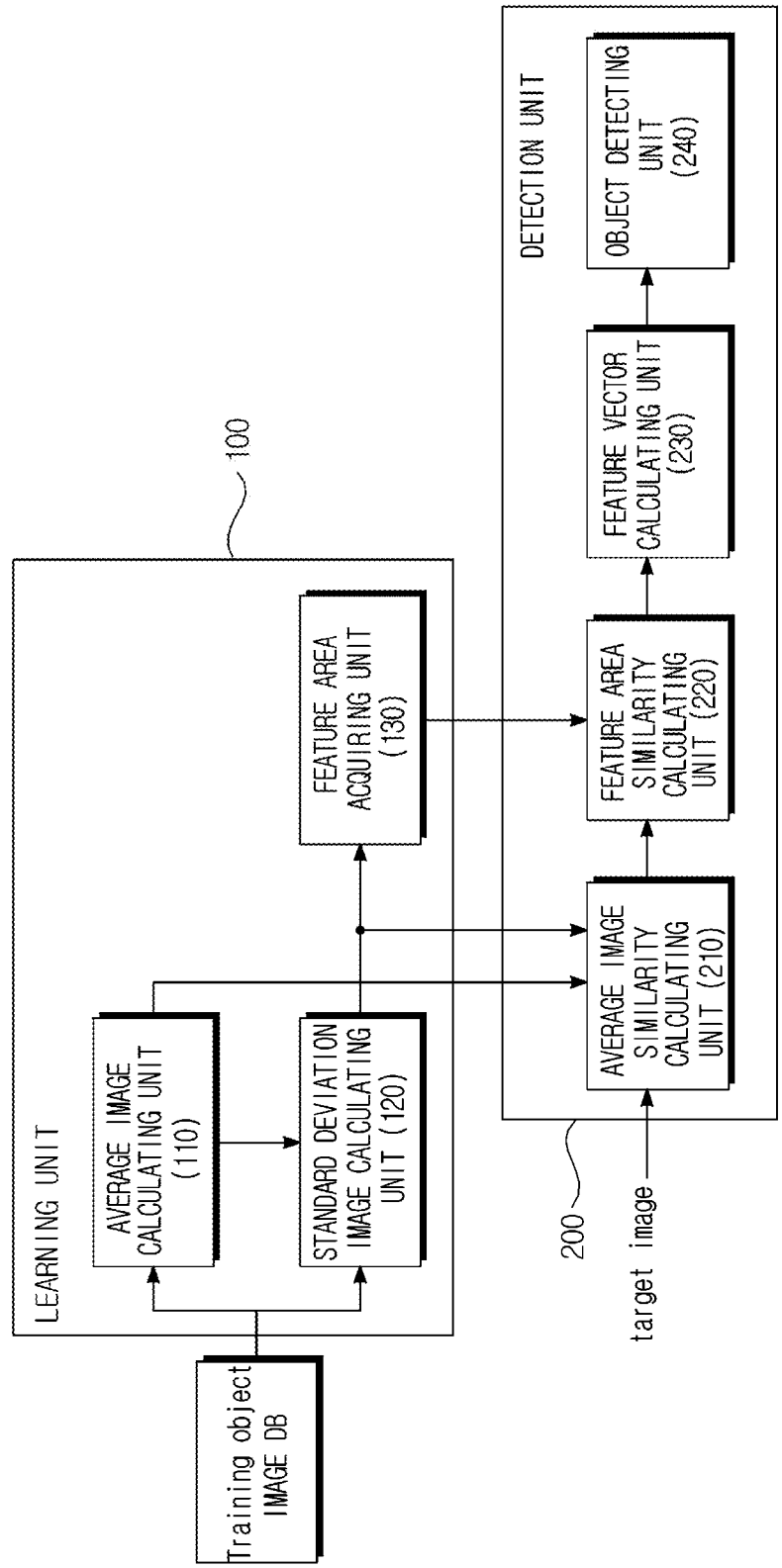

[Fig.2]
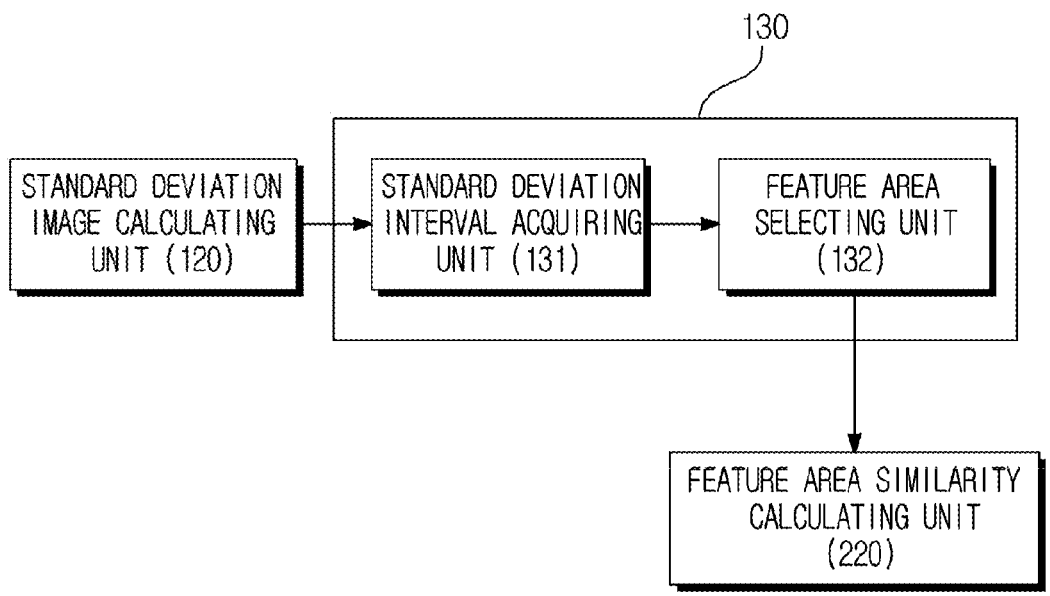
[Fig.3A]
[Fig.3B]
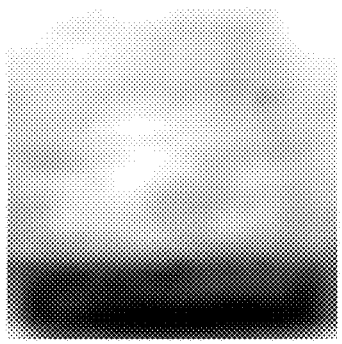

[Fig.3C]
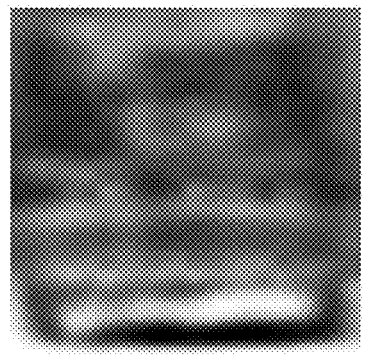
[Fig.3D]
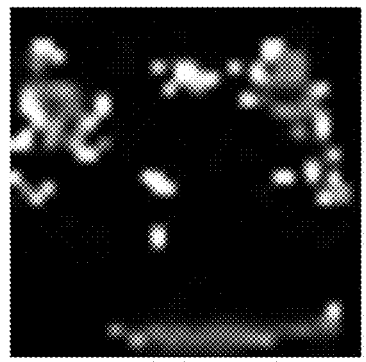
[Fig.4A]
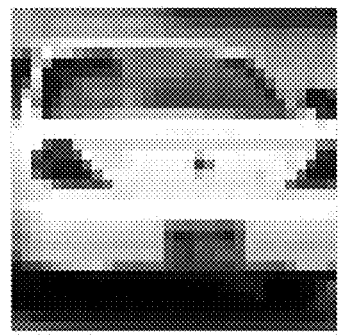

[Fig.4B]
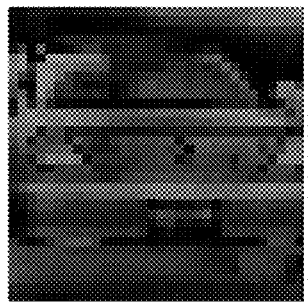
[Fig.4C]
[Fig.4D]
[Fig.5A]
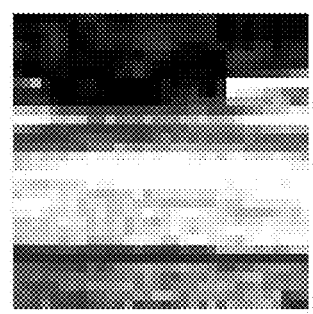

[Fig.5B]
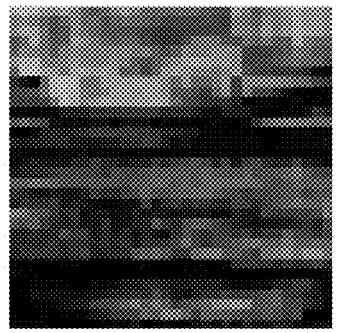
[Fig.5C]
[Fig.5D]
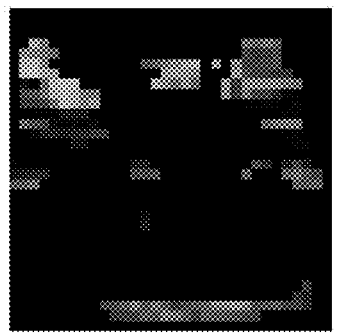

[Fig.6]
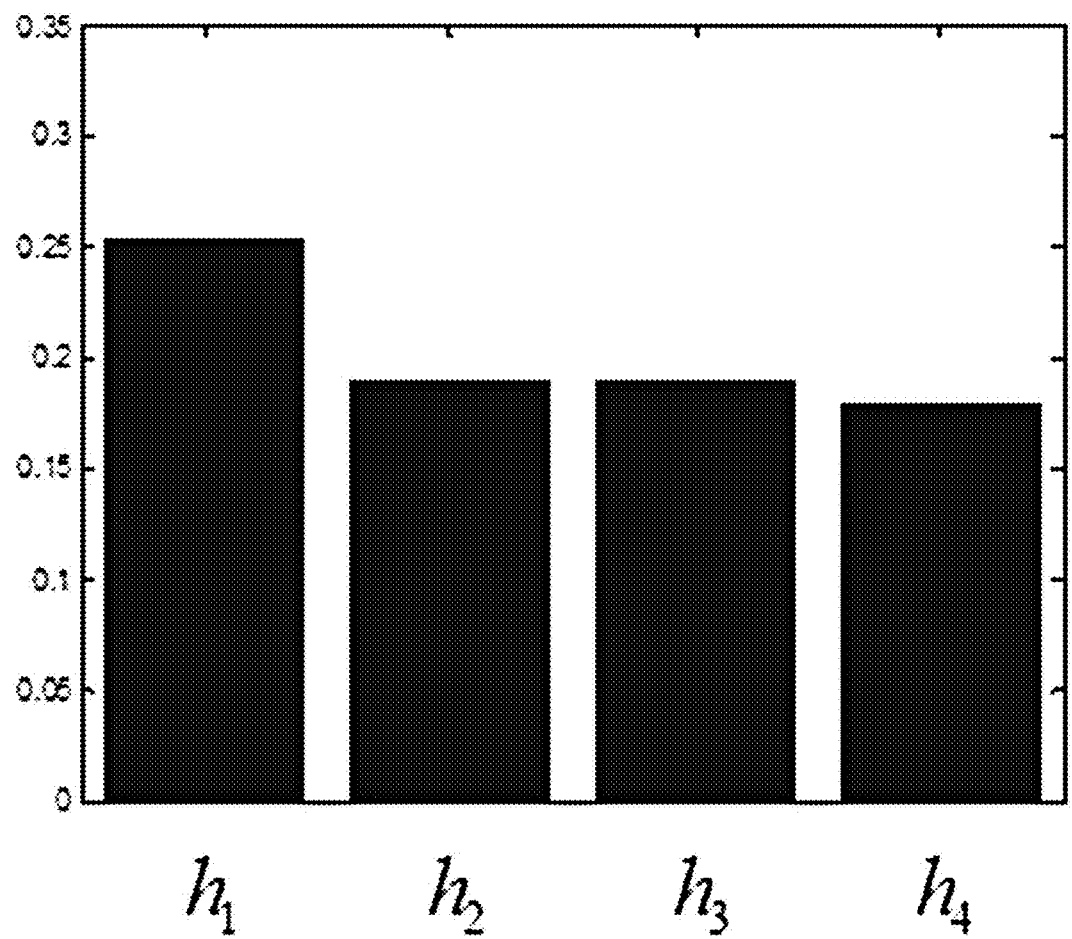

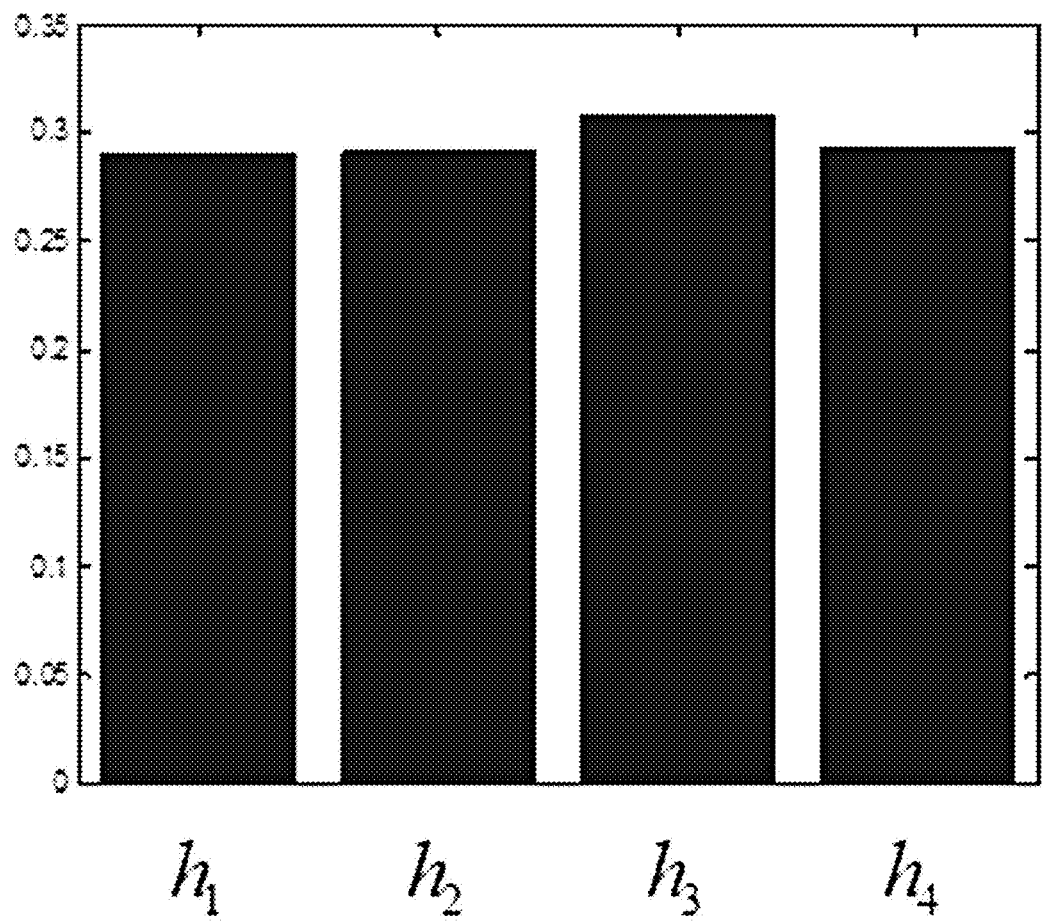
[Fig.7]

[Fig.8]
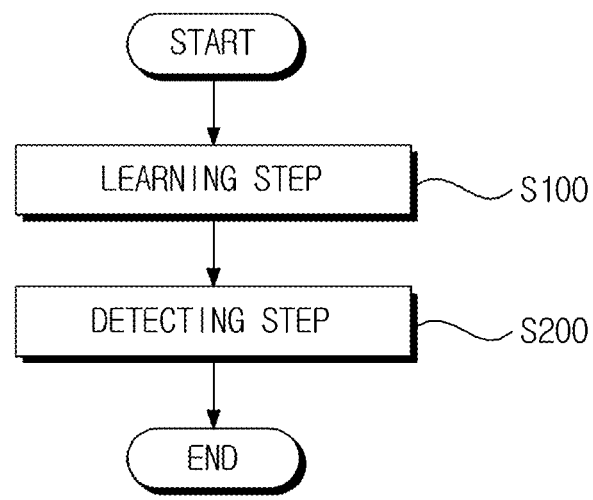
[Fig.9]
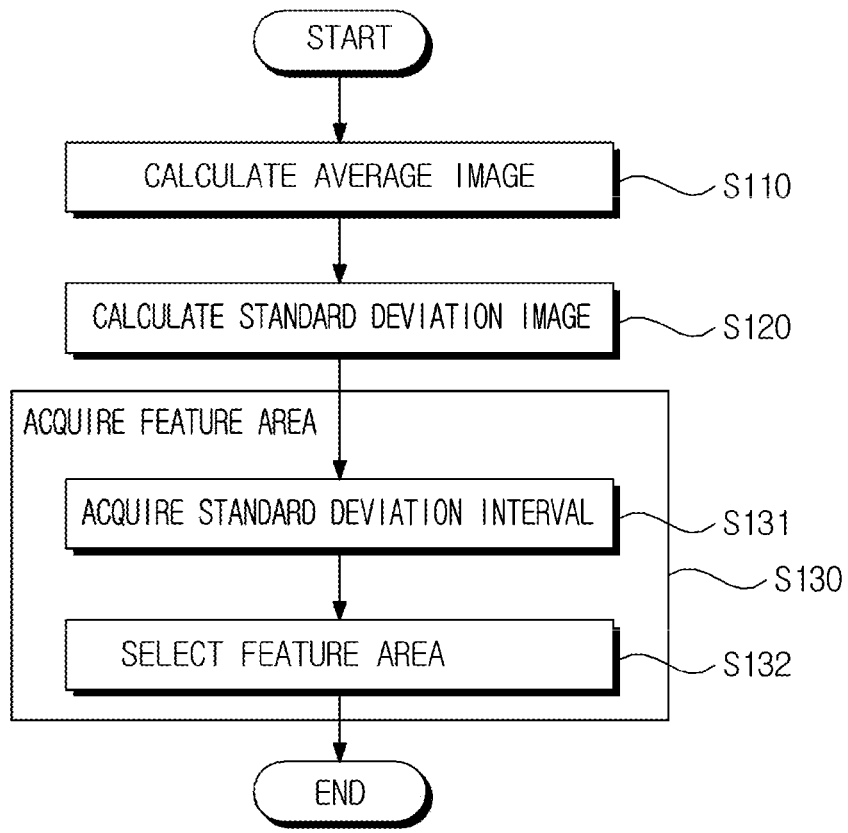

[Fig.10]
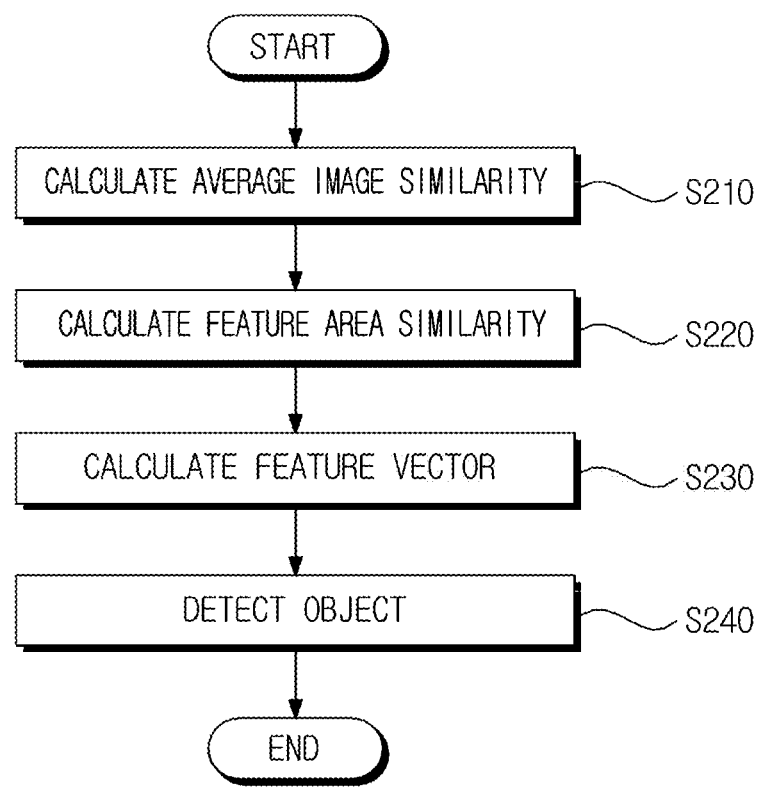

APPARATUS AND METHOD FOR OBJECT DETECTION BASED ON DOMINANT PIXEL INFORMATION

CROSS-REFERENCE TO RELATED APPLICATIONS

This application claims priority to and the benefit of Korean Patent Application No. 10-2014-0165450 filed in the Korean Intellectual Property Office on Nov. 25, 2014, the entire contents of which are incorporated herein by reference.

TECHNICAL FIELD

The present invention relates to an apparatus and a method for detecting an object in an image, and particularly, to an apparatus and a method for detecting a vehicle in an image.

BACKGROUND ART

An automatic object detection technology in which a computer automatically recognizes a type and a location of an object is a technology having high utilization in various industrial fields.

In particular, a vehicle detection technology as a technology that automatically detects a vehicle positioned around a user serves to automatically detect a vehicle which the driver does not recognize and help the driver drive the vehicle in a safer environment. Further, the vehicle detection technology is a technology that can be utilized in various fields such as automatic and safe driving of the vehicle or vehicle detection on a road. In particular, as a research into automation of driving of the vehicle and industrialization have been in progress in recent years, the vehicle detection technology as a previous step for automatic driving control has been remarkable as a primary research field.

The vehicle detection technology in the related art includes a vehicle detection scheme using an image sensor and a vehicle detection scheme using a radar sensor. The vehicle detection scheme using the radar sensor is disadvantageous in terms of cost efficiency in that vehicle detection performance deteriorates and further, an expensive radar sensor needs to be used.

The scheme that detects the object and the vehicle by using the image sensor in the related art includes a scheme using a Haar-like feature depending on a difference of a pixel value in the image and a scheme using a Gabor filter extracting a feature of the vehicle in a frequency domain. However, the scheme using the Haar-like feature has a problem in that detection performance deteriorates and the scheme using Gabor filter has a limit in that since a calculation amount is large, it takes a long calculation time.

The scheme that detects the object and the vehicle by using the image sensor in the related art further includes a scheme that extracts a feature of the object and detects the object by using a histogram of edge direction components. However, since the above scheme cannot consider an edge-direction distribution location, the above scheme has a problem in that there is a limit in the detection performance.

SUMMARY OF THE INVENTION

The present invention has been made in an effort to provide an apparatus and a method for object detection based on dominant pixel information which generate an average image and a standard deviation image of training object images, acquire a feature area representing a feature of a training object, and detect an object by using a value acquired by calculating a similarity between the average image in the feature area and a target image as a feature vector to efficiently detect a target object with a small calculation amount.

An exemplary embodiment of the present invention provides an apparatus for object detection based on dominant pixel information, including: a learning unit generating learning information to be used to detect a target object in a target image.

The learning unit may include an average image calculating unit receiving training object images to calculate an average image which is an image acquired by averaging the training object images; a standard deviation image calculating unit calculating a standard deviation image which is an image acquired by making a standard deviation of the training object images; and a feature area acquiring unit acquiring a feature area which is an area representing a primary feature of the training object included in the training object images by using the standard deviation image and setting an area corresponding to pixels selected from the standard deviation image according to a standard deviation value as the feature area.

The feature area may be a partial area in the standard deviation image, which includes pixels selected according to a standard deviation value of the standard deviation image.

The feature area acquiring unit may acquire two or more feature areas constituted by different pixels.

The average image calculating unit may receive the training object images and calculate an average of signal values of the respective pixels of the training object images for each coordinate of an image to calculate the average image.

The standard deviation image calculating unit may receive the training object images and the average image calculated by the average image calculating unit and calculate the standard deviation of the signal values of the respective pixels of the training object images for each coordinate of the image to calculate the standard deviation image.

The feature area acquiring unit may include a standard deviation interval acquiring unit arranging the respective pixels of the standard deviation image according to the size of the standard deviation of each pixel and dividing the pixels of the standard deviation image, which are arranged, into a predetermined number of intervals having a predetermined length to acquire a standard deviation interval including the pixels of the standard deviation image, which are arranged and divided based on the standard deviation; and a feature area selecting unit selecting pixels of the feature area by using the standard deviation interval.

The feature area selecting unit may select the standard deviation intervals of a predetermined number according to the size of the standard deviation and select pixels of the standard deviation image included in each selected standard deviation interval as the pixels of the feature area corresponding to each selected standard deviation interval.

Another exemplary embodiment of the present invention provides am apparatus for object detection, including: a detection unit receiving a target image and detecting a target object from the target image by using an average image previously set through learning and a feature area which is an area including some pixels in an image.

The detection unit may include a means of calculating a feature area similarity which is a similarity in the feature area between the average image and the target image, and a means of detecting the target object in the target image by using the feature area similarity.

The means of calculating the feature area similarity may calculate an average image similarity which is the similarity between the average image and the target image and calculate the feature area similarity by using the similarity between the feature area and the average image similarity.

The means of detecting the target object may detect the target object by using the calculated feature area similarity.

The means of detecting the target object may acquire a feature vector by using the feature area similarity calculated with respect to each of the feature areas of a predetermined number and detect the target object by using the acquired feature vector.

The detection unit may include an average image similarity calculating unit calculating the average image similarity by using the average image and a standard deviation image previously set through learning; a feature area similarity calculating unit selecting a part corresponding to the feature image in the average image similarity and calculating the feature area similarity by using a value of the average image similarity of the selected part; a feature vector calculating unit calculating the feature vector; and an object detecting unit detecting the target object in the target image by using the feature vector.

The average image similarity may be an array having the same size as the standard deviation image.

The average image similarity calculating unit may receive the target image and set a value acquired by dividing a difference between the signal value of each pixel of the target image and the signal value of the average image corresponding to the pixel coordinate by the signal value of the standard deviation image corresponding to the pixel coordinate as an element value of the similarity of the average image corresponding to the pixel coordinate.

The feature area similarity may be a size value calculated for each feature area.

The feature area similarity calculating unit may select a part corresponding to the feature image in the average image similarity and set the sum of absolute values of the feature area similarities of the selected part as the feature area similarity.

The feature vector calculating unit may set the feature area similarity calculated for each of feature areas of a predetermined number as an element of the feature vector.

The average image may be an image generated by calculating an average of signal values of the respective pixels of the training object images for each coordinate.

The standard deviation image may be an image generated by calculating a standard deviation of the signal values of the respective pixels of the training object images for each coordinate of the training object image.

The feature area may be a partial area in the standard deviation image, which includes a predetermined number of pixels selected according to a standard deviation value of the standard deviation image.

Yet another exemplary embodiment of the present invention provides an apparatus for object detection, including: a learning unit receiving training object images to calculate an average which is an image acquired by averaging the training object images, calculate a standard deviation image which is an image acquired by making a standard deviation of the training object images, and acquire a feature area which is an area showing a primary feature of the training object included in the training object images and set and acquire an area corresponding to pixels selected according to a standard deviation value of the standard deviation image as the feature area; and a detection unit receiving a target image and detecting the target object from the target image by using the average image and the feature area calculated by the learning unit.

The learning unit may calculate an average of signal values of respective pixels of the training object images in each coordinate of the training object image to calculate the average image and calculate a standard deviation of the signal values of the respective pixels of the training object images in each coordinate of the training object image to calculate the standard deviation image.

The learning unit may include an average image calculating unit calculating the average image; a standard deviation image calculating unit calculating the standard deviation image; and a feature area acquiring unit setting an area corresponding to the selected pixels according to a standard deviation value in the standard deviation image as the feature area.

The feature area acquiring unit may include a standard deviation interval acquiring unit acquiring a standard deviation interval including pixels of the standard deviation image, which are arranged and divided based on the standard deviation of each pixel of the standard deviation image; and a feature area selecting unit selecting pixels of the feature area by using the standard deviation interval.

The feature area selecting unit may select the standard deviation intervals of a predetermined number according to the size of the standard deviation and select the pixels of the standard deviation image included in each selected standard deviation interval as the pixels of the feature area corresponding to each selected standard deviation interval.

The detection unit may receive the target image, sets a value acquired by dividing a difference between the signal value of each pixel of the target image and the signal value of the average image corresponding to the pixel coordinate by the signal value of the standard deviation image corresponding to the pixel coordinate as an element value of the similarity of the average image, in calculating the average image similarity which is the similarity between the average image and the target image.

The detection unit may detect the target object in the target image by using the average image similarity.

The detection unit may select a part corresponding to the feature area in the average image similarity to set a value acquired by normalizing the sum of absolute values of the average image similarities of the selected part as the feature area similarity corresponding to the pixel coordinate, in calculating a feature area similarity which is a similarity in the feature area between the average image and the target image.

The detection unit may acquire the feature vector by using the feature area similarity and detect the target object by using the acquired feature vector.

According to exemplary embodiments of the present invention, by an apparatus and a method for object detection based on dominant pixel information, a target object can be efficiently detected with a small calculation amount.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1A-1C are block diagrams of an apparatus for object detection based on dominant pixel information according to an exemplary embodiment of the present invention.

FIG. 2 is a detailed block diagram of a feature area acquiring unit according to the present invention.

FIG. 3A-3D are reference images for describing an operation in which the feature area acquiring unit acquires a feature area according to the present invention.

FIG. 4A-4D are reference images for describing a result of calculating, by a detection unit, an average image similarity and a feature area similarity in an image including a target object according to the present invention.

FIG. 5A-5D are reference images for describing a result of calculating, by a detection unit, an average image similarity and a feature area similarity in an image not including the target object according to the present invention.

FIG. 6 is a reference diagram illustrating a feature vector which the detection unit calculates with respect to the image including the target object according to the present invention.

FIG. 7 is a reference diagram illustrating a feature vector which the detection unit calculates with respect to the image not including the target object according to the present invention.

FIG. 8 is a flowchart of a method for object detection based on dominant pixel information according to another exemplary embodiment of the present invention.

FIG. 9 is a detailed flowchart of a learning step of the method for object detection based on the dominant pixel information according to the present invention.

FIG. 10 is a detailed flowchart of a detecting step of the method for object detection based on the dominant pixel information according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. When reference numerals refer to components of each drawing, it is noted that although the same components are illustrated in different drawings, the same components are referred to by the same reference numerals as possible. Further, in the description of the present invention, the detailed descriptions of known related constitutions or functions thereof may be omitted if they make the gist of the present invention unclear. In addition, hereinafter, the exemplary embodiments of the present invention will be described, but the technical spirit of the present invention is not limited or restricted thereto and the technical spirit of the present invention can be modified and variously implemented by those skilled in the art.

FIG. 1A-1C are block diagrams of an apparatus for object detection of the present invention.

The apparatus for object detection based on the dominant pixel information according to the present invention may include a learning unit 100 or a detection unit 200, and if necessary, may include both the learning unit 100 and the detection unit 200.

In the exemplary embodiment, the apparatus for object detection based on the dominant pixel information according to the present invention includes only the learning unit 100 to first generate learning data. FIG. 1A is a block diagram of an apparatus for object detection according to the exemplary embodiment.

Further, in the exemplary embodiment, the apparatus for object detection based on the dominant pixel information according to the present invention includes only the detection unit 200 to receive the pre-learned learning data and perform the detection. FIG. 1B is a block diagram of an apparatus for object detection according to the exemplary embodiment.

Further, in the exemplary embodiment, the apparatus for object detection based on the dominant pixel information according to the present invention includes both the learning unit 100 and the detection unit 200 to perform the learning and the detection. FIG. 1C is a block diagram of an apparatus for object detection according to the exemplary embodiment.

As described above, the apparatus for object detection according to the present invention may include the learning unit 100 or the detection unit 200 or the learning unit 100 and the detection unit 200.

Herein, the learning unit 100 receives training object images to perform learning and the detection unit 200 may detect a target object in the target image by using the learned result of the learning unit 100. For example, the learning unit 100 receives various kinds of vehicle photographs as the training object images to perform the learning with respect to the vehicle photographs and the detection unit 200 may detect the vehicle that is the target object in the target image by using the learned or trained result.

Herein, detecting the vehicle that is the target object in the target image means detecting whether the target object is present in the image or at which position the target object is present in the target image.

Herein, if necessary, in order to detect other objects other than the vehicles, the learning unit 100 may use photographs including other objects other than the vehicle photographs as the training object images to perform the resulting learning and then the detection unit 200 may detect the other objects by using the learning result.

First, the learning unit 100 may receive the training object images to calculate an average image which is an averaged image of the training object images and calculate a standard deviation image which makes a standard deviation of the training object images and acquire a feature area which is an area representing a main feature of the training object included in the training object images by using the standard deviation image.

Herein, the feature area may be a partial area in the standard deviation image including pixels selected according to a standard deviation value of the standard deviation image. That is, the respective pixels of the standard deviation image have the standard deviation values as signal values thereof, and the learning unit 100 may select the pixels within a reference in which the standard deviation values are constant to set the area constituted by only the selected pixels as the feature area.

The learning unit 100 may acquire at least two feature areas constituted by different pixels. That is, when the learning unit 100 selects the pixels within the reference in which the standard deviation values are constant, the learning unit 100 may set various standard deviation intervals to select pixels for each standard deviation interval and set and acquire feature areas corresponding thereto, respectively.

A method of setting the feature areas will be described in more detail with referent to the following Equations.

The detection unit 200 may receive the target image to detect the target object in the target image by using the average image calculated in the learning unit 100 and the feature area.

Hereinafter, first, an operation of the learning unit 100 will be described.

The learning unit 100 generates learning information to be used for detecting the target object in the target image.

As illustrated in FIG. 1A, the learning unit 100 may include an average image calculating unit 110, a standard deviation image calculating unit 120, and a feature area acquiring unit 130.

The average image calculating unit 110 may receive the training object images to calculate an average image which is an averaged image of the training object images.

Herein, the average image calculating unit 110 may calculate an average of signal values of the respective pixels of the training object images for each coordinate of the image to calculate the average image. For example, the signal value of a coordinate (1,1) of the average image becomes an average value of signal values of pixels of the coordinate (1,1) of the training object images.

Herein, the average image calculating unit 110 may calculate the average image as the following Equation 1.

$$M = \frac{1}{N}\sum_{i}^{N} S_i = [m_1, m_2, \ldots, m_K]^T \quad \text{[Equation 1]}$$

(Herein, M is the average image, $m_i$ is a i-th element of m which represents a signal value of each pixel of the average image, K is the number of total pixels of the average image, $S_i$ is the training object image, and N is the number of training object images.)

The standard deviation image calculating unit 120 calculates the standard deviation image which is an image acquired by making a standard deviation of the training object images.

Herein, the standard deviation image calculating unit 120 may receive the training object images and the average image calculated in the average image calculating unit 110 and calculate a standard deviation of signal values of respective pixels of the training object images for each coordinate of the image to calculate the standard deviation image. For example, the signal value of a coordinate (1,1) of the standard deviation image is to be a value acquired by making a standard deviation of signal values of pixels of the coordinate (1,1) of the training object images.

Herein, the standard deviation image calculating unit 120 may calculate the average image as the following Equation 2.

$$\sum = \sqrt{\frac{1}{N}\sum_{i}^{N}(S_i - M)\circ(S_i - M)} = [\sigma_1, \sigma_2, \ldots, \sigma_K]^T \quad \text{[Equation 2]}$$

(Herein, $\Sigma$ is the standard deviation image, $S_i$ is the training object image, N is the number of training object images, M is the average image, $\sigma_i$ is a i-th element of $\sigma$ which represents a signal value of each pixel of the standard deviation image, and K is the number of total pixels of the standard deviation image.)

For reference, sizes of the standard deviation image and the average image are the same as each other.

The feature area acquiring unit 130 acquires the feature area which is an area representing a main feature of the training object included in the training object images by using the standard deviation image. In this case, the feature area acquiring unit 130 may set an area corresponding to pixels selected in the standard deviation image according to the standard deviation value as the feature area. Herein, the feature area acquiring unit 130 may determine an area with a predetermined size as the feature area in the order in which the standard deviation value is smaller in the standard deviation image. In addition, the feature area acquiring unit 130 may acquire at least two feature areas constituted by different pixels.

An operation of the feature area acquiring unit 130 will be described below in more detail with reference to FIG. 2.

FIG. 2 is a detailed block diagram of the feature area acquiring unit 130 according to the present invention.

As illustrated in FIG. 2, the feature area acquiring unit 130 may include a standard deviation interval acquiring unit 131 and a feature area selecting unit 132.

The standard deviation interval acquiring unit 131 arranges each pixel of the standard deviation image according to a size of the standard deviation of each pixel, divides the arranged pixels of the standard deviation image into a predetermined number of intervals having a predetermined length to acquire a standard deviation interval including the pixels of the standard deviation image arranged and divided based on the standard deviation.

Herein, the standard deviation interval acquiring unit 131 first generates an array formed by arranging the respective pixels of the standard deviation image based on the standard deviation and then divides the arrangement of the pixels arranged above into intervals with the same length to make a predetermined number of intervals. In this case, each interval becomes the standard deviation interval and the respective pixels of the standard deviation image are divided based on the size of the standard deviation by dividing the standard deviation interval as described above.

Herein, the standard deviation interval acquiring unit 131 may arrange each pixel of the standard deviation image in ascending order based on the standard deviation size to generate the arrangement.

An operation of the standard deviation interval acquiring unit 131 may be expressed as the following Equation 3.

$$B_k = \left\{\xi_j \mid (k-1)\left\lceil\frac{K}{L}\right\rceil + 1 \le j \le k\left\lceil\frac{K}{L}\right\rceil\right\} \quad \text{[Equation 3]}$$

(Herein, $B_k$ is the standard deviation interval in which an index is k, K is the number of total pixels of the standard deviation image, L is a length of the standard deviation interval, $\xi_j$ is a -th element of $\xi$ which is an arrangement in which pixels of the standard deviation image are arranged in order of size of the standard deviation.

The feature area selecting unit 132 selects pixels of the feature area by using the standard deviation interval.

Herein, the feature area selecting unit 132 may select a predetermined number of standard deviation intervals according to a size of the standard deviation and select pixels of the standard deviation image included in the selected standard deviation intervals as pixels of the feature area corresponding to the selected standard deviation interval. Herein, the feature area selecting unit 132 may select the standard deviation interval in the order in which the size of the standard deviation is smaller.

That is, the pixels included in the standard deviation interval form the feature area corresponding to the standard deviation interval. Accordingly, the feature area is classified according to a size of the standard deviation in the standard deviation image to be constituted by pixels having the standard deviation size within the predetermined reference.

An operation of the feature area selecting unit 132 may be expressed as the following Equations 4 and 5.

$$U_k = [u_{(k,1)}, u_{(k,2)}, \ldots, u_{(k,K)}]^T \quad \text{[Equation 4]}$$

Herein, $U_k$ represents the selected feature area corresponding to the standard deviation interval $B_k$ like Equation 3 as a 2D image having the same size as the standard deviation image. Herein, K is the number of total pixels of the standard deviation image, u(k,i) is a function having a value of 1 if it is the feature area or a value of 0 if not and is calculated as the following Equation 5.

$$u_{(k,i)} = \begin{cases} 1, & \text{if } (\sigma_i \in B_k) \\ 0, & \text{else} \end{cases} \quad \text{[Equation 5]}$$

(Herein, $\sigma_i$ represents a pixel at an index i location of the standard deviation image and $B_k$ represents the k-th standard deviation interval.)

Referring to the Equations 4 and 5, for example, the feature area selecting unit 132 may select $U_1$, $U_2$, $U_3$, $U_4$ having k values of 1 to 4 as the feature area in the order in which the standard deviation is smaller and select a predetermined number of feature areas in the order in which the standard deviation is smaller.

FIG. 3A-3D are reference images (32×32 pixel size) for describing an operation in which the feature area acquiring unit 130 acquires the feature area according to the present invention. FIG. 3A-3D illustrate a case where the training object image is a vehicle image.

FIG. 3A illustrates one image of the training object images, FIG. 3B illustrates the average image, FIG. 3C illustrates the standard deviation image, and FIG. 3D represents the feature area. As verified in FIG. 3A-3D, a low standard deviation is shown at a shadow generated on the bottom of the vehicle and the top of the vehicle, and it may be referred to as dominant pixels in the vehicle image. In the apparatus of object detection based on the dominant pixel information according to the present invention, the learning unit 100 finds the above dominant pixels through learning to set the dominant pixels as the feature area, and as described below in detail, the detection unit 200 detects the target object by using the feature area.

Next, an operation of the detection unit 200 will be described in more detail.

The detection unit 200 receives the target image and detects the target object in the target image by using the average image pre-set through learning and the feature area which is an area including some pixels in the image. The average image and the feature area may be calculated or set in the learning unit 100 as described above.

Herein, the detection unit 200 may include a means which calculates feature area similarity which is similarity in the feature area between the average image and the target image and a means which detects the target object in the target image by using the feature area similarity.

Herein, the means of calculating the feature area similarity may calculate average image similarity which is the similarity between the average image and the target image and calculate the feature area similarity by using the feature area and the average image similarity. A method of calculating the average image similarity and the feature area similarity by the detection unit 200 will be described below in more detail.

Herein, the means of detecting the target object may detect the target object by using the calculated feature area similarity. In this case, the means of detecting the target object may acquire a feature vector by using the feature area similarities calculated with respect to the predetermined number of feature areas and detect the target object by using the acquired feature vector.

Herein, the means of calculating the feature area similarity and the means of detecting the target object may be implemented by more detailed configurations as described below.

As illustrated in FIG. 1B, the detection unit 200 may include an average image similarity calculating unit 210, a feature area similarity calculating unit 220, a feature vector calculating unit 230, and an object detecting unit 240.

The average image similarity calculating unit 210 calculates the average image similarity by using the average image and the standard deviation image previously set through learning. Herein, the average image similarity may be an arrangement having the same size as the standard deviation image and preferably, may be a 2D arrangement.

In this case, the average image similarity calculating unit 210 receives the target image and may set a value obtained by dividing a difference between a signal value of each pixel of the target image and a signal value of the average image corresponding to the pixel coordinate by the signal value of the standard deviation image corresponding to the pixel coordinate as an element value of the average image similarity corresponding to the pixel coordinate.

An operation of the average image similarity calculating unit 210 may be expressed as the following Equation 6.

$$Z = \left(\frac{1}{\Sigma}\right) \circ (S_T - M) \quad \text{[Equation 6]}$$

(Herein, Z is the average image similarity, $\Sigma$ is the standard deviation image, M is the average image, $S_T$ is the target image, and $\circ$ means a multiply operation between vector components.)

The feature area similarity calculating unit 220 selects a part corresponding to the feature area from the average image similarity and calculates the feature area similarity by using a value of the average image similarity of the selected part. Herein, the feature area similarity may be a numerical value representing the average image similarity in the feature area.

Herein, the feature area similarity may be a size value calculated for each feature area.

The feature area similarity calculating unit 220 preferably selects a part corresponding to the feature area from the average image similarity to set a value acquired by normalizing the sum of absolute values of the average image similarity of the selected part as the feature area similarity.

Herein, the feature area similarity calculating unit 220 may calculate the feature area similarity as the following Equation 7.

$$h_k = \frac{\|U_k \circ Z\|_1}{\|U_k\|_1} \quad \text{[Equation 7]}$$

(Herein, $U_k$ represents the k-th feature area like Equation 4, Z is the average image similarity, $h_k$ is the feature area similarity calculated with respect to the k-th feature area $U_k$, and $\| \ \|_1$ represents an operation calculating a size of the vector included in an operation formula.)

The feature vector calculating unit 230 calculates the feature vector.

Herein, the feature vector calculating unit 230 may set the feature area similarity calculated for the predetermined number of feature areas as an element of the feature vector. That is, as given in Equation 7, the feature area similarity calculated with respect to the feature area becomes the element of the feature vector.

Herein, the feature vector calculating unit 230 may set the feature vector as the following Equation 8.

$$V=[h_1, \ldots, h_k, \ldots, h_n] \quad [\text{Equation 8}]$$

Herein, V is the feature vector, and $h_k$ is the feature area similarity calculated like Equation 7, and n is the total number of feature areas.

For example, when a total of four feature areas ($U_1$, $U_2$, $U_3$, $U_4$) are selected in the feature area acquiring unit 130, the feature vectors may be set as $V=[h_1, h_2, h_3, h_4]$.

The object detecting unit 240 detects the target object in the target image by the feature vector. Herein, the object detecting unit 240 may use various known methods of detecting the object in the image by using the feature vector.

Herein, the object detecting unit detects the object by using the feature vector calculated according to the present invention together with the feature vector acquired by another known different method to improve object detection performance.

FIGS. 4 to 7 are reference diagrams illustrating an operation of a detection unit 120 according to the present invention when a vehicle image is set as a training object image, a learning unit 110 acquires an average image, a standard deviation image, and a feature area, and a detection unit 200 detects a vehicle as a target object in a target image.

FIG. 4A-4D are reference images (32×32 pixel size) for describing a result of calculating, by a detection unit 200, an average image similarity and a feature area similarity in an image including a target object according to the present invention.

FIG. 4A illustrates a target image including a vehicle, FIG. 4B illustrates the average image similarity calculated with respect to FIG. 4A, FIG. 4C illustrates the feature area, and FIG. 4D illustrates a result of acquiring the average image similarity (FIG. 4B) and the feature area (FIG. 4C) through Equation 7. Herein, in FIG. 4C, all of four feature areas are marked by a white color for easy description.

FIG. 6 is a reference diagram illustrating a feature vector $V=[h_1, h_2, h_3, h_4]$ which the detection unit 200 calculates according to the present invention in the case of FIG. 4A-4D.

FIG. 5A-5D are reference images (32×32 pixel size) for describing a result of calculating, by a detection unit 200, an average image similarity and a feature area similarity in an image not including a target object according to the present invention.

FIG. 5A illustrates a target image not including a vehicle, FIG. 5B illustrates the average image similarity calculated with respect to FIG. 5A, FIG. 5C illustrates the feature area, and FIG. 5D illustrates a result of acquiring the average image similarity (FIG. 5B) and the feature area (FIG. 5C) through Equation 7.

FIG. 7 is a reference diagram illustrating a feature vector $V=[h_1, h_2, h_3, h_4]$ which the detection unit 200 calculates according to the present invention in the case of FIG. 5A-5D.

When the feature vectors calculated in FIGS. 4 and 6 and FIGS. 5 and 7 are compared with each other, in respect to a feature vector acquired according to the feature area acquired by using a vehicle image as a training object image, it may be verified that the feature vector when the target image includes the vehicle as the target object (FIG. 6) is smaller than that when the image does not include the vehicle. This represents that the learning unit 100 may effectively detect the target object by using the feature vector calculated according to the acquired feature area.

An apparatus for object detection based on dominant pixel information according to an exemplary embodiment of the present invention may include a learning unit 100 and a detection unit 200 as described below.

The learning unit 100 receives training object images to calculate an average image which is an image acquired by averaging the training object images, to calculate a standard deviation image which is an image acquired by making a standard deviation of the training object images, and acquire a feature area which is an area showing a primary feature of the training object included in the training object images and set and acquire an area corresponding to pixels selected according to a standard deviation value of the standard deviation image as the feature area.

The detection unit 200 may receive the target image and detect the target object from the target image by using the average image and the feature area calculated by the learning unit 100.

Herein, the learning unit 100 calculates an average of signal values of respective pixels of the training object images in each coordinate of the training object image to calculate the average image and calculates a standard deviation of the signal values of the respective pixels of the training object images in each coordinate of the training object image to calculate the standard deviation image.

Herein, the feature area is preferably two or more areas constituted by different pixels.

Herein, the detection unit 200 preferably receives the target image and sets a value acquired by dividing a difference between the signal value of each pixel of the target image and the signal value of the average image corresponding to the pixel coordinate by the signal value of the standard deviation image corresponding to the pixel coordinate as an element value of the similarity of the average image, in calculating the average image similarity which is the similarity between the average image and the target image. In addition, the detection unit 200 may detect the target object from the target image by using the average image similarity.

Herein, the detection unit 200 preferably selects a part corresponding to the feature area in the average image similarity to set a value acquired by normalizing the sum of absolute values of the average image similarities of the selected part as the feature area similarity corresponding to the pixel coordinate and may acquire the feature vector by using the feature area similarity and detect the target object by using the acquired feature vector, in calculating the feature area similarity which is the similarity in the feature area between the average image and the target image.

Next, the detection unit 200 may set the feature area similarity calculated for a predetermined number of feature areas each as an element of the feature vector and detect the target object by using the set feature vector, in acquiring the feature vector by using the feature area similarity calculated for the predetermined number of feature areas each.

FIG. 8 is a flowchart of a method for object detection based on dominant pixel information according to yet another exemplary embodiment of the present invention.

The method for object detection based on dominant pixel information according to the present invention may include a learning step (S100) or a detecting step (S200) and include both the learning step (S100) and the detecting step (S200) as necessary. In an embodiment, the method for object detection based on dominant pixel information according to the present invention includes only the learning step (S100) to first generate learning data. Further, in an embodiment, the method for object detection based on dominant pixel information according to the present invention includes only the detecting step (S200) to perform detection by receiving previously learned learning data. Further, in an embodiment, the method for object detection based on dominant pixel information according to the present invention includes both the learning step (S100) and the detecting step (S200) to perform learning and detection.

The method for object detection based on dominant pixel information according to the present invention may operate in a scheme which is the same as a scheme in which the apparatus for object detection based on dominant pixel information according to the present invention described in detail with reference to FIG. 1A-1C given above operates. Therefore, hereinafter, a duplicated part will be omitted and the method for object detection will be described in brief.

In the learning step (S100), training object images are received to calculate an average image which is an image acquired by averaging the training object images, calculate a standard deviation image which is an image acquired by making a standard deviation of the training object images, and acquire a feature area which is an area showing a primary feature of the training object included in the training object images by using the standard deviation image.

In the detecting step (S200), the target image is received and the target object is detected from the target image by using the average image calculated by the learning unit 100 and the feature area.

FIG. 9 is a detailed flowchart of the learning step (S100).

In the learning step (S100), learning information to be used for detecting the target object in the target image is generated.

The learning step (S100) may include an average image calculating step (S110), a standard deviation image calculating step (S120), and a feature area acquiring step (S130).

In the average image calculating step (S110), the training object images are received to calculate an average image which is an image acquired by averaging the training object images. Herein, in the average image calculating step (S110), an average of signal values of respective pixels of the training object images is calculated for each coordinate of the image to calculate the average image.

In the standard deviation image calculating step (S120), a standard deviation image which is an image acquired by making a standard deviation of the training object images is calculated to calculate the standard deviation image. Herein, in the standard deviation image calculating step (S120), the training object images and the average image calculated by the average image calculating unit 110 are received and the standard deviation of the signal values of the respective pixels of the training object images is calculated for each coordinate of the image to calculate the standard deviation image.

In the feature area acquiring step (S130), a feature area which is an area representing a primary feature of the training object included in the training object images is acquired by using the standard deviation image and an area corresponding to pixels selected according to a standard deviation value of the standard deviation image is set and acquired as the feature area. Herein, in the feature area acquiring step (S130), a predetermined area may be decided as the feature area according to the size of the standard deviation in the standard deviation image.

Herein, the feature area acquiring step (S130) may include a standard deviation interval acquiring step (S131) and a feature area selecting step (S132).

In the standard deviation interval acquiring step (S131), the respective pixels of the standard deviation image are arranged in the order of the size of the standard deviation of each pixel and the pixels of the standard deviation image, which are arranged, are divided into a predetermined number of intervals having a predetermined length to acquire a standard deviation interval including the pixels of the standard deviation image, which are arranged and divided based on the standard deviation.

In the feature area selecting step (S132), a predetermined number of standard deviation intervals are selected according to the size of the standard deviation and the pixels of the standard deviation image included in each selected standard deviation interval are selected as the pixels of the feature area corresponding to each selected standard deviation interval.

FIG. 10 is a detailed flowchart of the detecting step (S200).

In the detecting step (S200), the target image is received and the target object is detected from the target image by using an average image previously set through learning and a feature area which is an area including some pixels in the image.

The detecting step (S200) may include an average image similarity calculating step (S210), a feature area similarity calculating step (S220), a feature vector calculating step (S230), and an object detecting step (S240).

In the average image similarity calculating step (S210), in calculating an average image similarity which is the similarity between the average image and the target image, the average image similarity is calculated by using the average image and a standard deviation image previously set through the learning.

In the feature area similarity calculating step (S220), in calculating the feature area similarity which is the similarity in the feature area between the average image calculated by the learning unit 100 and the target image, a part corresponding to the feature area in the average image similarity is selected to calculate the feature area similarity by using a value of the average image similarity of the selected part.

In the feature vector calculating step (S230), a feature vector having the feature area similarity calculated for each of the predetermined number of feature areas as an element is calculated.

In the object detecting step (S240), the target object is detected in the target image by using the feature vector.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for object detection located on a vehicle, the apparatus comprising:
a learning unit configured to, using a processor, receive a plurality of training object images,
wherein the learning unit includes:
an average image calculating unit configured to, using the processor, calculate an average image of the plurality of training object images;
a standard deviation image calculating unit configured to, using the processor, calculate a standard deviation image of the plurality of training object images;
a feature area acquiring unit configured to, using the processor, acquire a feature area by selecting a plurality of pixels of the standard deviation image, the feature area having the same number of pixels as the standard deviation image, each of the pixels of the feature area having a value of 1 or 0, the pixels of the feature area having the value of 1 corresponding to a primary feature of the training object included in the training object images, the number of pixels having the value of 1 in the feature area being less than the number of pixels in the feature area; and
a detection unit configured to, using the processor, receive a target image, and to detect a target object from the target image by comparing the target image to an area of the average image corresponding to the pixels having the value of 1 in the feature area calculated by the learning unit, and wherein the feature area acquiring unit includes:
a standard deviation interval acquiring unit configured to, using the processor, acquire a standard deviation interval including the plurality of pixels of the standard deviation image, the plurality of pixels of the standard deviation image being arranged and divided based on corresponding standard deviations of the standard deviation image; and
a feature area selecting unit configured to, using the processor, select a plurality of pixels of the feature area using the standard deviation interval,
wherein the feature area selecting unit selects standard deviation intervals of a predetermined number according to the size of the standard deviation and selects the pixels of the standard deviation image included in each selected standard deviation interval as the pixels of the feature area corresponding to each selected standard deviation interval.

2. The apparatus of claim 1, wherein the learning unit calculates an average of signal values of respective pixels of the training object images in each coordinate of the training object images to calculate the average image and calculates a standard deviation of the signal values of the respective pixels of the training object images in each coordinate of the training object images to calculate the standard deviation image.

3. The apparatus of claim 1, wherein the detection unit receives the target image, sets a value acquired by dividing a difference between a signal value of each pixel of the target image and a signal value of the average image corresponding to a pixel coordinate by a signal value of the standard deviation image corresponding to the pixel coordinate as an element value of the similarity of the average image, and detects the target object in the target image by using the average image similarity, in calculating the average image similarity which is the similarity between the average image and the target image.

4. The apparatus of claim 3, wherein the detection unit selects a part corresponding to the feature area in the average image similarity to set a value acquired by normalizing the sum of absolute values of the average image similarities of the selected part as the feature area similarity corresponding to the pixel coordinate and acquires a feature vector by using the feature area similarity and detects the target object by using the acquired feature vector, in calculating a feature area similarity which is a similarity in the feature area between the average image and the target image.

* * * * *